United States Patent
Lee

(10) Patent No.: US 12,526,246 B2
(45) Date of Patent: Jan. 13, 2026

(54) DATA INPUT BUFFER FOR EFFECTIVELY CALIBARATING OFFSET

(71) Applicant: FIDELIX CO., LTD., Seongnam-si (KR)

(72) Inventor: Jae Jin Lee, Gwangju-si (KR)

(73) Assignee: FIDELIX CO., LTD., Seongnam-si (KR)

( * ) Notice: Subject to any disclaimer, the term of this patent is extended or adjusted under 35 U.S.C. 154(b) by 540 days.

(21) Appl. No.: 18/111,285

(22) Filed: Feb. 17, 2023

(65) Prior Publication Data
US 2023/0308402 A1    Sep. 28, 2023

(30) Foreign Application Priority Data
Mar. 28, 2022  (KR) .......................... 10-2022-0038165

(51) Int. Cl.
*H04L 49/90*    (2022.01)

(52) U.S. Cl.
CPC .................................. *H04L 49/90* (2013.01)

(58) Field of Classification Search
CPC ..... H04L 49/90; G11C 7/1084; G11C 7/1087; G11C 7/109; G11C 7/22; H03K 19/018521
See application file for complete search history.

(56) References Cited

U.S. PATENT DOCUMENTS

| | | | | |
|---|---|---|---|---|
| 5,880,624 A | * | 3/1999 | Koyanagi | H03K 17/167 323/317 |
| 5,973,486 A | * | 10/1999 | Van Auken | G01R 19/16538 327/143 |
| 7,072,355 B2 | * | 7/2006 | Kizer | H03M 9/00 714/E11.207 |
| 9,673,968 B2 | * | 6/2017 | Sengoku | H03L 7/081 |
| 10,291,240 B2 | * | 5/2019 | Im | H03L 7/095 |
| 10,660,197 B2 | * | 5/2020 | Butcher | H05K 1/0228 |
| 10,830,799 B1 | * | 11/2020 | Lee | G01R 19/32 |
| 2001/0028590 A1 | * | 10/2001 | Ishikawa | G11C 16/30 365/226 |
| 2012/0293156 A1 | * | 11/2012 | Galbis | H02M 3/1588 323/350 |
| 2014/0149654 A1 | * | 5/2014 | Venkatesan | G11C 5/147 327/307 |

(Continued)

FOREIGN PATENT DOCUMENTS

| | | | | |
|---|---|---|---|---|
| CN | 101132173 A | * | 2/2008 | ......... H04L 25/0298 |
| CN | 107925641 A | * | 4/2018 | ............. H04L 27/06 |

(Continued)

*Primary Examiner* — Sujoy K Kundu
*Assistant Examiner* — Vladislav Y Agureyev
(74) *Attorney, Agent, or Firm* — KILE PARK REED & HOUTTEMAN PLLC

(57) ABSTRACT

A data input buffer includes a switching circuit; a reception circuit that includes a reception response unit and a reference response unit; and a code generating circuit. The data input buffer buffers a reception data signal to generate a buffered data signal, the reception data signal being an analog signal, and the buffered data signal being a digital signal, and a relative magnitude of a reference response conductance with respect to the reception response conductance is sequentially changed according to a sequential change of the calibration code, in the calibration mode.

20 Claims, 15 Drawing Sheets

(56) References Cited

U.S. PATENT DOCUMENTS

| | | | |
|---|---|---|---|
| 2015/0309526 A1* | 10/2015 | Dinc | H03M 1/164 |
| | | | 327/108 |
| 2015/0340069 A1* | 11/2015 | Arai | G11C 29/021 |
| | | | 326/30 |
| 2016/0006439 A1* | 1/2016 | Williams | G06F 13/28 |
| | | | 326/38 |
| 2016/0204749 A1* | 7/2016 | Li | H03F 3/45183 |
| | | | 330/254 |
| 2016/0372171 A1* | 12/2016 | Ko | G11C 7/109 |
| 2017/0366183 A1* | 12/2017 | Jung | G11C 11/4085 |
| 2018/0048324 A1* | 2/2018 | Samad | H03M 1/1014 |
| 2018/0054206 A1* | 2/2018 | Im | G11C 7/222 |
| 2018/0082721 A1* | 3/2018 | Okuma | G11C 7/1084 |
| 2020/0145036 A1* | 5/2020 | Lee | G11C 7/1084 |
| 2020/0302979 A1* | 9/2020 | Kim | G11C 29/028 |
| 2021/0090675 A1* | 3/2021 | M | G11C 7/22 |
| 2021/0151086 A1* | 5/2021 | Lai | G11C 13/0038 |
| 2021/0167783 A1* | 6/2021 | Shin | H03K 5/131 |
| 2022/0013163 A1* | 1/2022 | Jung | G11C 7/109 |
| 2022/0165321 A1* | 5/2022 | Seo | G11C 11/4093 |
| 2022/0216860 A1* | 7/2022 | Kimura | G06F 1/10 |
| 2023/0147293 A1* | 5/2023 | Cho | G11C 11/4099 |
| | | | 365/189.09 |

FOREIGN PATENT DOCUMENTS

| | | | | | |
|---|---|---|---|---|---|
| CN | 113990023 | B | * | 1/2023 | G08B 17/103 |
| EP | 2396885 | B1 | * | 11/2013 | H03K 19/0005 |
| EP | 3980860 | B1 | * | 4/2024 | H03K 5/135 |
| GB | 2308453 | A | * | 6/1997 | G01R 19/16519 |
| JP | 3829088 | B2 | * | 10/2006 | G11C 16/26 |
| JP | 2013175264 | A | * | 9/2013 | G11C 29/78 |
| KR | 20060099325 | A | * | 9/2006 | H02K 29/08 |
| TW | 202123590 | A | * | 6/2021 | |
| WO | WO-2019166642 | A1 | * | 9/2019 | H02M 7/219 |

\* cited by examiner

DATA INPUT BUFFER FOR EFFECTIVELY CALIBARATING OFFSET

CROSS-REFERENCE TO RELATED APPLICATION

This application claims priority to and the benefit of Korean Patent Application No. 2022-0038165 under 35 U.S.C. § 119, filed on Mar. 28, 2022 in the Korean Intellectual Property Office (KIPO), the disclosure of which is incorporated herein by reference in its entirety.

BACKGROUND

1. Technical Field

The disclosure relates to a data input buffer, and more specifically, to a data input buffer that effectively calibrates for offset.

2. Description of the Related Art

A semiconductor memory device includes data input buffers. The data input buffer may be a circuit that buffers a reception data signal corresponding to an analog type external data signal received through a data pad based on a reference voltage, and provides a buffered data signal.

For example, in case that the voltage of the reception data signal is higher than the reference voltage, the buffered data signal may have the logic state of "H". In case that the voltage of the reception data signal is lower than the reference voltage, the buffered data signal may have the logic state of "L".

Semiconductor memory devices are becoming increasingly low-power and high-speed. Accordingly, the data input buffer is required to provide a buffered data signal having an effective data value, even for the reception data signal having a very small voltage difference with respect to the reference voltage.

In order to meet this demand, the data input buffer may be generally implemented as differential amplifier. Between components symmetrically disposed in the differential amplifier, an offset may be generated due to an error in design, manufacturing process, package, etc. and a difference in external environment.

Due to the offset between the symmetrical components, the logic state of the buffered data signal may be transitioned based on a voltage level different from the reference voltage.

In general, in order to calibrate such an offset, the data input buffer may have a function of calibrating the offset using a calibration code.

However, in the conventional data input buffer, after the code value of the calibration code is set, the voltage level of the reception data signal is changed in a direction, and it is checked (or determined) whether the transition of the buffered data signal is occurred with reference to the reference voltage. If it is checked that the transition of the buffered data signal occurs at a voltage different from the reference voltage, the code value of the calibration code is changed and set. Then, the process of changing the voltage level of the reception data signal in a direction is repeated again.

In such a conventional data input buffer, a time required for offset calibration is inefficiently increased.

SUMMARY

The disclosure is directed to a data input buffer capable of effectively calibrating for offset.

In an embodiment, the data input buffer according to the disclosure may include a switching circuit that controls a voltage of a reception input signal and a reference voltage to a substantially same level in a calibration mode in which a calibration enable signal is activated; a reception circuit that includes a reception response unit and a reference response unit, and generates a buffered data signal, wherein the reception response unit has a reception response conductance which depends on the voltage of the reception input signal, the reference response unit has a reference response conductance which depends on a level of the reference voltage, and the buffered data signal has a logic state depending on a magnitude relationship between the reception response conductance and the reference response conductance in the calibration mode; and a code generating circuit that generates a calibration code including 1-st to n-th calibration signal sequentially activated, being a natural number equal to greater than 2. The data input buffer buffers a reception data signal to generate the buffered data signal, the reception data signal being an analog signal, and the buffered data signal being a digital signal, and the calibration code is sequentially changed in the calibration mode, and is latched in response to the transition of the buffered data signal. The relative magnitude of the reference response conductance with respect to the reception response conductance is sequentially changed according to a sequential change of the calibration code, in the calibration mode.

The switching circuit may include an equalization switch that is disposed between the reception data signal and the reference voltage, and is turned-on in the calibration mode.

The switching circuit may include a normal reception switch that electrically connects the reception data signal to a data pad in a normal mode in which the calibration enable signal is deactivated, and the data pad may receive an external data signal provided from an outside; a normal reference switch that electrically connects the reference voltage to a set voltage in the normal mode; a reception equalization switch that electrically connects the reception data signal to a biasing voltage in the calibration mode; and a reference equalization switch that electrically connects the reference voltage to the biasing voltage in the calibration mode.

The reception circuit may be enabled in response to activation of a data strobe signal, and the reception circuit may include a reception responding part that includes the reception response unit and the reference response unit, wherein the reception response unit may be disposed between a common node and a reception intermediate node, the reference response unit may be disposed between the common node and a reference intermediate node, and the common node may be electrically connected to a power voltage according to activation of the data strobe signal; a reception amplifying part that is electrically connected to the reception intermediate node and the reference intermediate node, and generates a reception preliminary signal and a reference preliminary signal, wherein the reception preliminary signal and the reference preliminary signal may be amplified in opposite directions according to a voltage magnitude relationship between the reception intermediate node and the reference intermediate node; and a reception latch part that receives the reception preliminary signal and the reference preliminary signal, and latches the buffered data signal, wherein the buffered data signal may have a logic state according to the voltage magnitude relationship between the reception preliminary signal and the reference preliminary signal.

The reception circuit may further include an enable transistor that is disposed between the power voltage and the common node, and electrically connects the common node to the power voltage in response to activation of the data strobe signal.

The reception response unit may include a reception basic means and 1-st to p-th response portions formed in parallel with each other between the common node and the reception intermediate node, 'p' being a natural number smaller than n, the reception basic portion may have a reception basic conductance depending on the voltage of the reception data signal, the 1-st to p-th response portions may be enabled in response to activation of 1-st to p-th calibration signals, respectively, and may have 1-st to p-th response conductances depending on the voltage of the reception data signal, and the reference response unit may include a reference basic portion and (p+1) to n-th response portions disposed in parallel with each other between the common node and the reference intermediate node, the reference basic portion may have a reference basic conductance depending on the level of the reference voltage, and the (p+1)-th to n-th response portions may be enabled in response to activation of (p+1)-th to n-th calibration signals, respectively, and may have (p+1)-th to n-th response conductances depending on the level of the reference voltage.

The 1-st to p-th response conductances may be sequentially decreased in the calibration mode, and the (p+1)-th to n-th response conductances may be sequentially increased in the calibration mode.

The reference response unit may further include a precision response portion that is disposed in parallel with the reference basic portion and the (p+1)-th to n-th response portions between the common node and the reference intermediate node, enabled in the calibration mode, and has a precision conductance depending on the level of the reference voltage, the precision conductance being smaller than the (p+1)-th response conductance.

The reception response unit may further include a compensation response portion that is disposed in parallel with the reception basic portion and the 1-st to p-th response portions between the common node and the reception intermediate node, and is disenabled in the calibration mode.

The reception latch part may include a buffer reception unit that generates a reception buffer signal and a reference buffer signal with buffering the reception preliminary signal and the reference preliminary signal; and a buffer latch unit that receives the reception buffer signal and the reference buffer signal, and generates the buffered data signal, wherein the buffered data signal may have a logic state corresponding to the logic state of the reception buffer signal and the reference buffer signal, and the logic states of the reception buffer signal and the reference buffer signal may be latched by the buffer latch unit according to an inactivation of the data strobe signal.

The 'n' may be less than or equal to '2' to the power of 'q', 'q' being a natural number, and the code generating circuit may include a coding generating part that generates 1-st to q-th coding signals, wherein the 1-st coding signal may alternately rise and fall according to a pulse of a data strobe signal, the data strobe signal may be a pulse signal that is periodically and repeatedly activated in the calibration mode, and a t-th coding signal may alternately rise and fall according to a pulse of a (t−1)-th coding signal, 't' being a natural number from 2 to q; a sequential signal generating part that generates 1-st to n-th sequential signals with using the 1-st to q-th coding signals, wherein the 1-st to n-th sequential signals may be sequentially activated; a sequential enable generating part that generates a sequential enable signal, wherein the sequential enable signal may be activated in response to activation of a calibration enable signal, and the calibration enable signal may be deactivated in response to the transition of the buffered data signal; and a calibration signal generating part that generates 1-st to n-th calibration signals with receiving the 1-st to n-th sequential signals, wherein the logic state of an i-th calibration signal may correspond to the logic state of an i-th sequential signal during activation of the sequential enable signal, and may be latched in response to deactivation of the sequential enable signal, 'i' being a natural number from 1 to n.

The coding generating part includes 1-st to q-th coding generating units that may generate the 1-st to q-th coding signals.

The 1-st coding generating unit may include a 1-st input code portion that receives the inverted signal of the 1-st coding signal and generates a 1-st input code signal, wherein the 1-st input code signal may be controlled to a logic state that is inverted from the inverted signal of the 1-st coding signal in response to an one-way transition of the data strobe signal with a delay, and is latched as a first logic state in response to deactivation of the calibration enable signal; and a 1-st output code portion that generates the 1-st coding signal with inverting the 1-st input code signal in response to other one-way transition of the data strobe signal.

The t-th coding generating unit may include a t-th input code portion that receives the inverted signal of the t-th coding signal and generates a t-th input code signal, wherein the t-th input code signal may be controlled to a logic state that is inverted from the inverted signal of the t-th coding signal in response to an one-way transition of the (t−1)-th coding signal, and is latched as a first logic state in response to deactivation of the calibration enable signal; and a t-th output code portion that generates the t-th coding signal with inverting the t-th input code signal in response to another one-way transition of the (t−1)-th coding signal.

The sequential enable generating part may include a calibration pulse generating unit that generates a calibration pulse in response to activation of the calibration enable signal; a transition signal generating unit that generates a transition pulse in response to transition of the buffered data signal; and a sequential enable generating unit that generates the sequential enable signal, wherein the sequential enable signal may be activated in response to a pulse generation of the calibration pulse, and may be deactivated in response to a pulse generation of the transition pulse.

The calibration signal generating part may include 1-st to n-th calibration generating units, and an i-th calibration generating unit may include a calibration switch that transmits the i-th sequential signal in case that the sequential enable signal is activated; and a calibration latch portion that generates an i-th calibration signal, wherein the logic state of the i-th calibration signal may correspond to that of the i-th sequential signal transmitted through the calibration switch, and the logic state of the i-th calibration signal may be latched according to deactivation of the sequential enable signal.

In an embodiment, a memory device may include a data input buffer comprising a switching circuit that controls a voltage of a reception input signal and a reference voltage to a substantially same level in a calibration mode in which a calibration enable signal is activated; a reception circuit that includes a reception response unit and a reference response unit, and generates a buffered data signal, wherein the reception response unit may have a reception response conductance which depends on the voltage of the reception input signal, the reference response unit may have a reference response conductance which depends on a level of the reference voltage, and the buffered data signal may have a logic state depending on a magnitude relationship between the reception response conductance and the reference response conductance in the calibration mode; and a code generating circuit that generates a calibration code including 1-st to n-th calibration signals sequentially activated, wherein the calibration code may be sequentially changed in the calibration mode, and may be latched in response to a transition of the buffered data signal, 'n' being a natural number equal to greater than 2, wherein the data input buffer may buffer a reception data signal to generate the buffered data signal, the reception data signal being an analog signal, and the buffered data signal being a digital signal, and a relative magnitude of the reference response conductance with respect to the reception response conductance may be sequentially changed according to a sequential change of the calibration code, in the calibration mode.

The reception circuit may be enabled in response to activation of a data strobe signal, and the reception circuit may include a reception responding part that includes the reception response unit and the reference response unit, wherein the reception response unit may be disposed between a common node and a reception intermediate node, the reference response unit may be disposed between the common node and a reference intermediate node, and the common node may be electrically connected to a power voltage according to activation of the data strobe signal; a reception amplifying part that is electrically connected to the reception intermediate node and the reference intermediate node, and generates a reception preliminary signal and a reference preliminary signal, wherein the reception preliminary signal and the reference preliminary signal may be amplified in opposite directions according to a voltage magnitude relationship between the reception intermediate node and the reference intermediate node; and a reception latch part that receives the reception preliminary signal and the reference preliminary signal, and latches the buffered data signal, wherein the buffered data signal may have a logic state according to the voltage magnitude relationship between the reception preliminary signal and the reference preliminary signal.

The reception response unit may include a reception basic means and 1-st to p-th response portions formed in parallel with each other between the common node and the reception intermediate node, 'p' being a natural number smaller than n, the reception basic portion may have a reception basic conductance depending on the voltage of the reception data signal, the 1-st to p-th response portions may be enabled in response to activation of 1-st to p-th calibration signals, respectively, and may have 1-st to p-th response conductances depending on the voltage of the reception data signal, and the reference response unit may include a reference basic portion and (p+1) to n-th response portions disposed in parallel with each other between the common node and the reference intermediate node, the reference basic portion may have a reference basic conductance depending on the level of the reference voltage, and the (p+1)-th to n-th response portions may be enabled in response to activation of (p+1)-th to n-th calibration signals, respectively, and may have (p+1)-th to n-th response conductances depending on the level of the reference voltage.

The 1-st to p-th response conductances may be sequentially decreased in the calibration mode, and the (p+1)-th to n-th response conductances may be sequentially increased in the calibration mode.

It is to be understood that the embodiments above are described in a generic and explanatory sense only and not for the purpose of limitation, and the disclosure is not limited to the embodiments described above.

BRIEF DESCRIPTION OF THE DRAWINGS

The above and other objects, features and advantages of the disclosure will become more apparent to those skilled in the art by describing in detail embodiments thereof with reference to the accompanying drawings, in which.

DETAILED DESCRIPTION OF THE EMBODIMENTS

Figure 1:
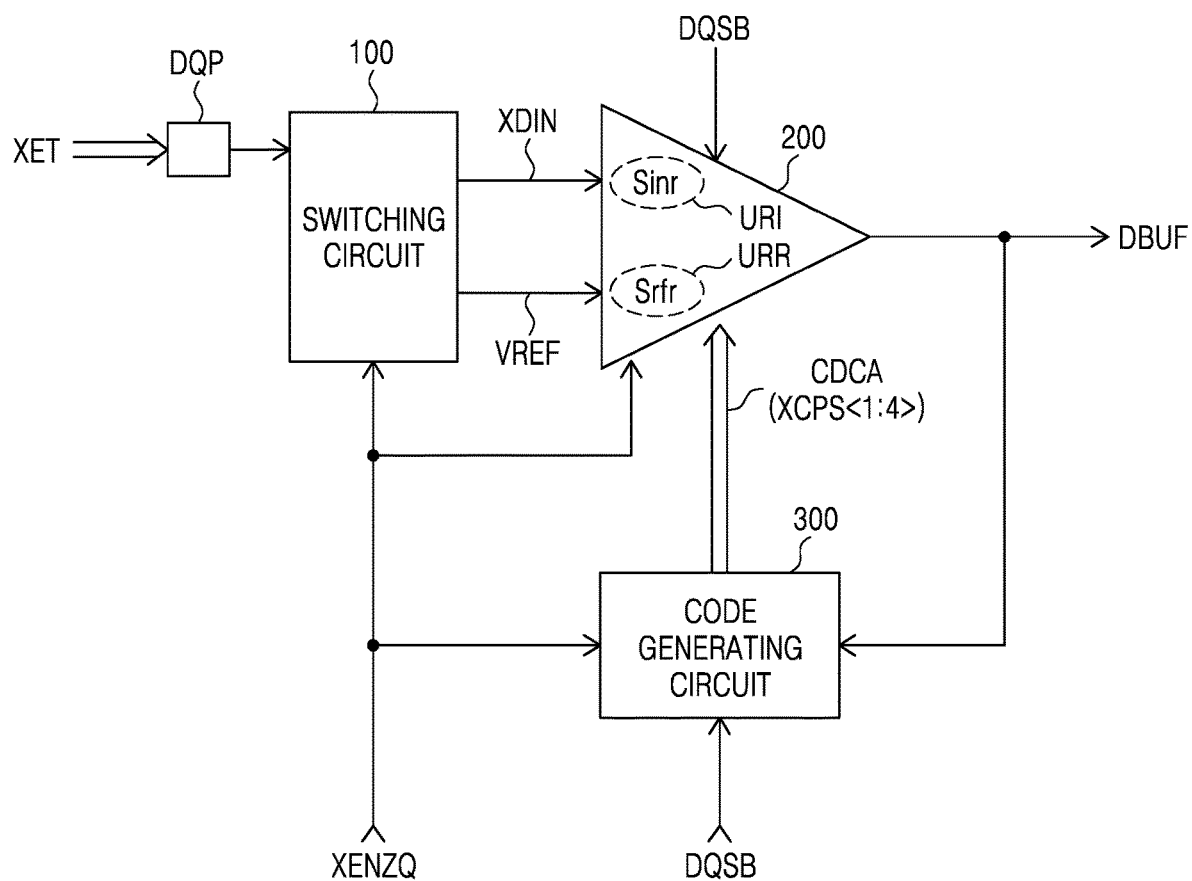
FIG. 1 is a schematic diagram illustrating the data input buffer according to an embodiment of the disclosure.

Embodiments of the disclosure will be described in detail below with reference to the accompanying drawings. While the disclosure is shown and described in connection with embodiments thereof, it will be apparent to those skilled in the art that various modifications can be made without departing from the spirit and scope of the disclosure. Thus, the scope of the disclosure is not limited to these particular following embodiments.

The terminology used herein is for the purpose of describing particular embodiments only and is not intended to be limiting of the disclosure. As used herein, the singular forms, such as "a" and "an," are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As customary in the field, some embodiments are described and illustrated in the accompanying drawings in terms of functional blocks, units, parts, and/or modules.

Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments of the disclosure will be described in detail with reference to the accompanying drawings.

FIG. 1 is a diagram illustrating the data input buffer according to an embodiment of the disclosure. The data input buffer of the disclosure may buffer a reception data signal XDIN to generate a buffered data signal DBUF. The reception data signal XDIN may be an analog signal, and the buffered data signal DBUF may be a digital signal.

Figure 2:
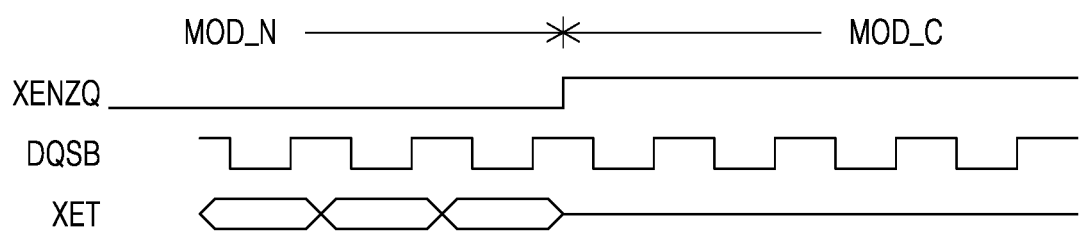
FIG. 2 is a schematic diagram for explaining an operation mode of the data input buffer of FIG. 1 and main signals related thereto.

Prior to describing the data input buffer of FIG. 1 in detail, an operation mode of the data input buffer of the disclosure and related signals will be briefly described with reference to FIG. 2.

The operation mode of the data input buffer of the disclosure can be largely divided into a normal mode MOD_N and a calibration mode MOD_C.

A calibration enable signal XENZQ may be deactivated to "L" in the normal mode MOD_N and may be activated to "H" in the calibration mode MOD_C.

A data strobe signal DQSB may be a pulse signal that is periodically and repeatedly activated. The data strobe signal DQSB may be externally provided in the normal mode MOD_N. The data strobe signal DQSB may be generated inside the semiconductor memory device including the data input buffer of the disclosure in the calibration mode MOD_C.

In the normal mode MOD_N, an external data signal XET representing valid data corresponding to a pulse of the data strobe signal DQSB may be provided to a data pad DQP. On the other side, in the calibration mode MOD_C, even in case that the pulse of the data strobe signal DQSB is generated, an effective external data signal XET is not provided.

In general, in a semiconductor memory device, there may be a section (or part) in which a valid data is not received. The calibration mode MOD_C in the data input buffer of the disclosure may be set in a period in which the valid data is not received. As a result, in case of the data input buffer of the disclosure, the operation speed decrease due to the driving of the calibration mode MOD_C may not occur.

Referring again to FIG. 1, the data input buffer of the disclosure may comprise a switching circuit 100, a reception circuit 200 and a code generating circuit 300.

The switching circuit 100 may control the voltage of the reception input signal XDIN and a reference voltage VREF to the same level in a calibration mode MOD_C. In the calibration mode MOD_C, the calibration enable signal XENZQ may be activated with "H".

Figure 3A:
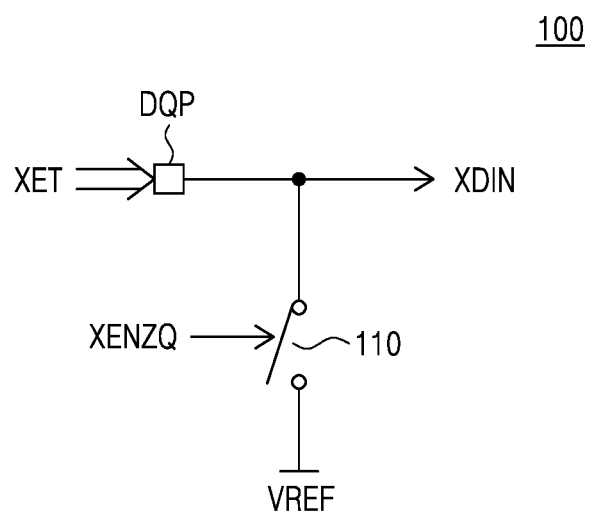
FIG. 3A and FIG. 3B are schematic diagrams of an equivalent circuit illustrating examples of the switching circuit of FIG. 1.

FIG. 3A is a schematic diagram of an equivalent circuit illustrating an example of the switching circuit 100 of FIG. 1. Referring to FIG. 3A, the switching circuit 100 of FIG. 3A may include an equalization switch 110. The equalization switch 110 may be disposed or formed between the reception data signal XDIN and the reference voltage VREF. In the calibration mode MOD_C, the equalization switch 110 may be turned-on in response to activation of the calibration enable signal XENZQ.

Accordingly, the voltage of the reception input signal XDIN and the reference voltage VREF may be controlled to the same level in the calibration mode MOD_C.

In FIG. 3A, a data pad DQP may receive the external data signal XET in the normal mode MOD_N, in which the calibration enable signal is deactivated. The reception input signal XDIN and the external data signal XET may have the same voltage level.

Figure 3B:
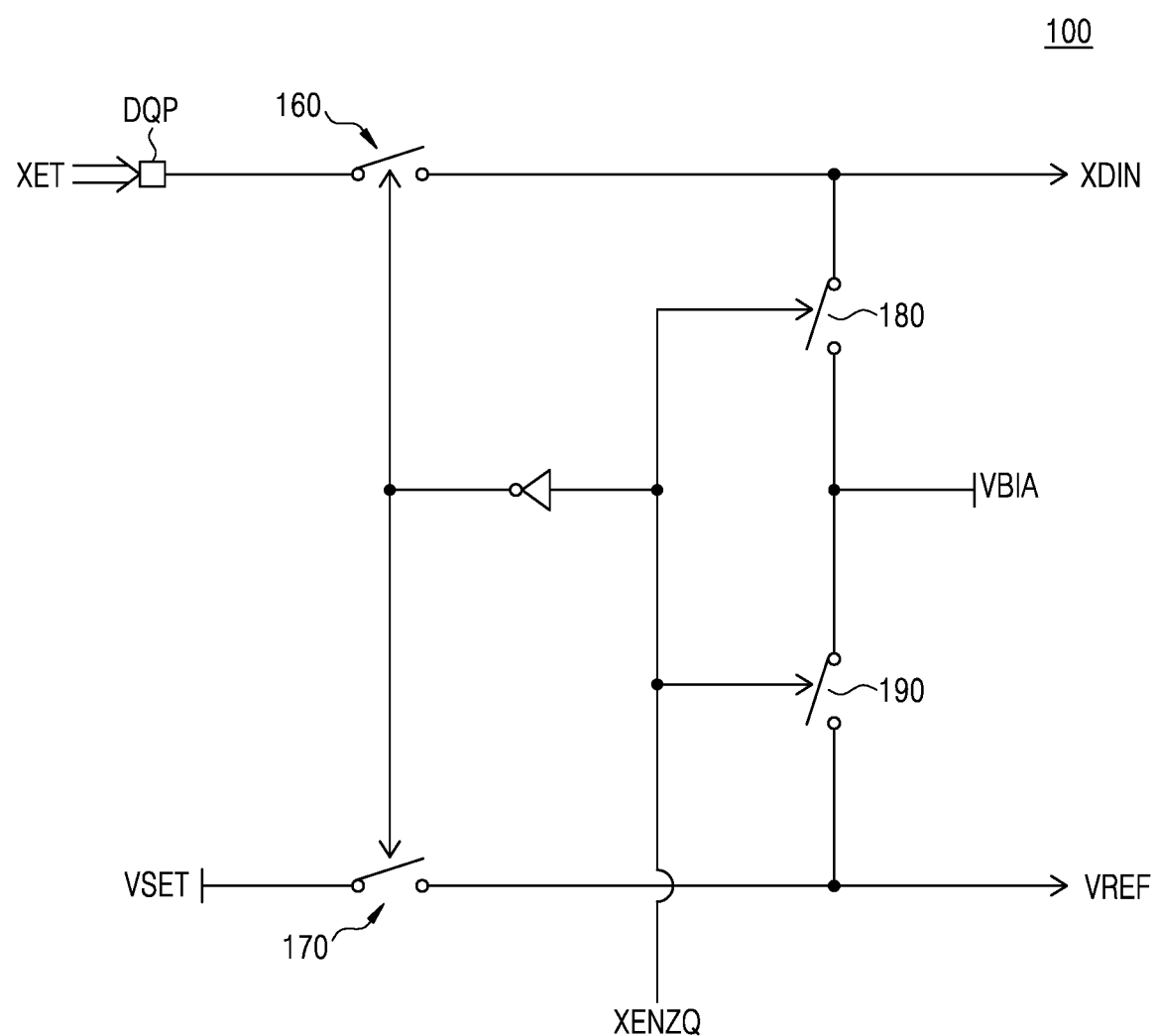

FIG. 3B is a schematic diagram of an equivalent circuit illustrating another example of the switching circuit 100 of FIG. 1. Referring to FIG. 3B, the switching circuit 100 of FIG. 3B may include a normal reception switch 160, a normal reference switch 170, a reception equalization switch 180 and a reference equalization switch 190.

The normal reception switch 160 may electrically connect the reception data signal XDIN to the data pad DQP in the normal mode MOD_N. The data pad DQP may receive the external data signal XET, which is provided from the outside.

The normal reference switch 170 may electrically connect the reference voltage VREF to a set voltage VSET in the normal mode MOD_N.

In the calibration mode MOD_C, the reception equalization switch 180 may electrically connect the reception data signal XDIN to a biasing voltage VBIA, and the reference equalization switch 190 may electrically connect the reference voltage VREF to the biasing voltage VBIA.

Accordingly, the voltage of the reception input signal XDIN may be controlled to the same level as the reference voltage VREF, in the calibration mode MOD_C. The reception input signal XDIN may have a voltage level corresponding to the voltage level of the external data signal XET, in the normal mode MOD_N.

Referring again to FIG. 1, the reception circuit 200 may be enabled in response to the activation of "L" of the data strobe signal DQSB. The reception circuit 200 may include a reception response unit (or reception response part) URI and a reference response unit (or reference response part) URR, and may generate the buffered data signal DBUF.

The reception response unit URI may have a reception response conductance Sinr, and the reference response unit URR may have a reference response conductance Srfr. The reception response conductance Sinr may depend on the voltage of the reception input signal XDIN, and the reference response conductance Srfr may depend on the level of the reference voltage VREF.

In the calibration mode MOD_C, the relative magnitude of the reference response conductance Srfr with respect to the reception response conductance Sinr may be sequentially changed according to the sequential change of a calibration code CDCA.

The calibration code CDCA may include (or may consist of) n calibration signal XCPS. Here, 'n' is a natural number equal to or greater than 2. The code value of the calibration code CDCA may correspond to a combination of logic states of the n calibration signals XCPS.

In this embodiment, it is assumed that 'n' is '4' and the calibration code CDCA may include (or may consist of) 1-st to 4-th calibration signals XCPS<1> to XCPS<4>.

Figure 4:
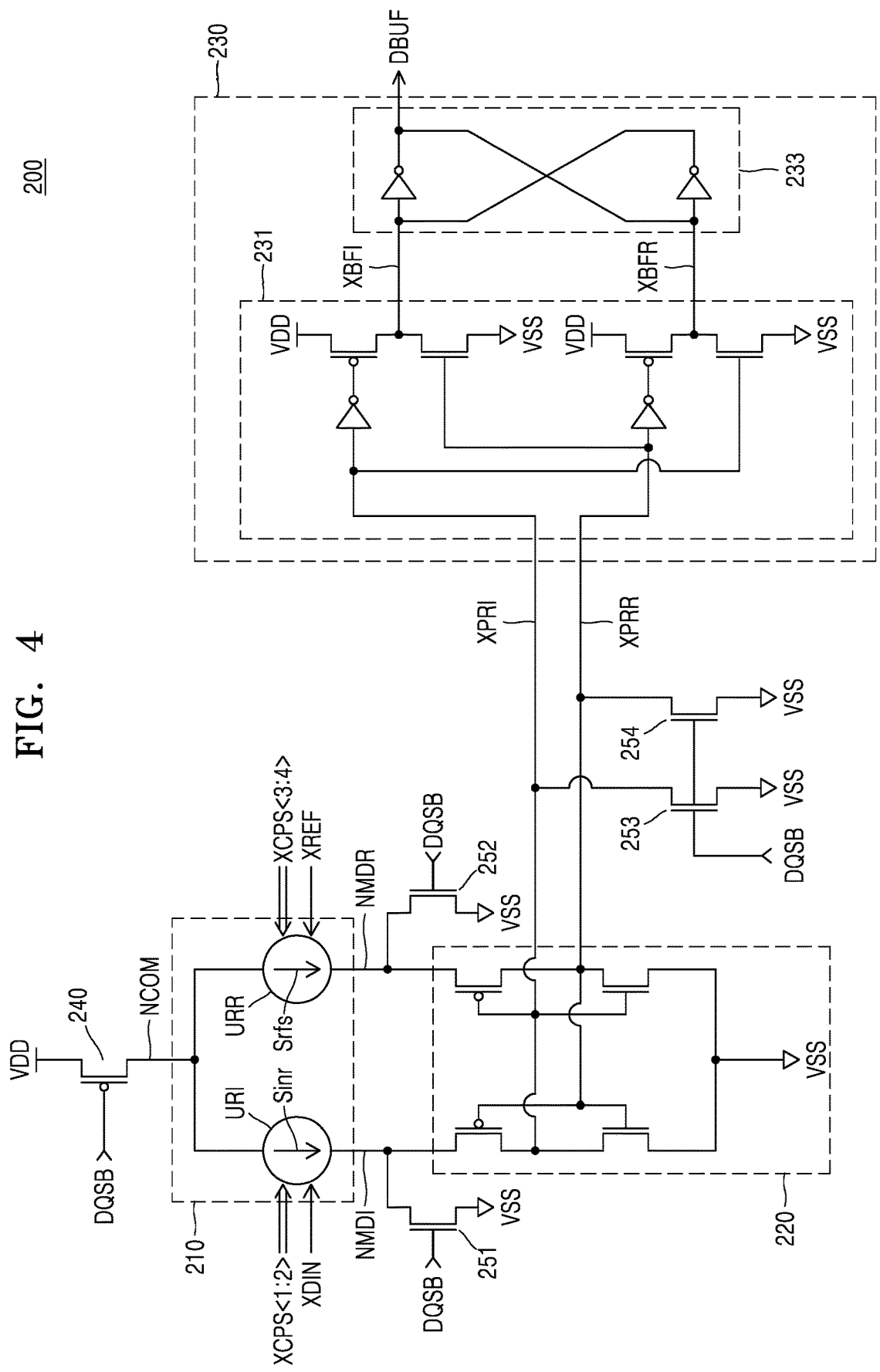
FIG. 4 is a diagram of an equivalent circuit illustrating the reception circuit of FIG. 1.

FIG. 4 is a diagram of an equivalent circuit illustrating the reception circuit 200 of FIG. 1. Referring to FIG. 4, the reception circuit 200 may include a reception responding part 210, a reception amplifying part 220 and a reception latch part 230, and may further include an enable transistor 240.

The enable transistor 240 may be a PMOS type transistor, which is formed between the power voltage VDD and the common node NCOM. The enable transistor 240 may electrically connect the common node NCOM to the power voltage VDD in response to activation of the data strobe signal DQSB.

The reception responding part 210 may include the reception response unit URI and the reference response unit URR. The reception response unit URI may be disposed or formed between the common node NCOM and a reception intermediate node NMDI, and the reference response unit URR may be disposed or formed between the common node NCOM and a reference intermediate node NMDR.

Figure 5:
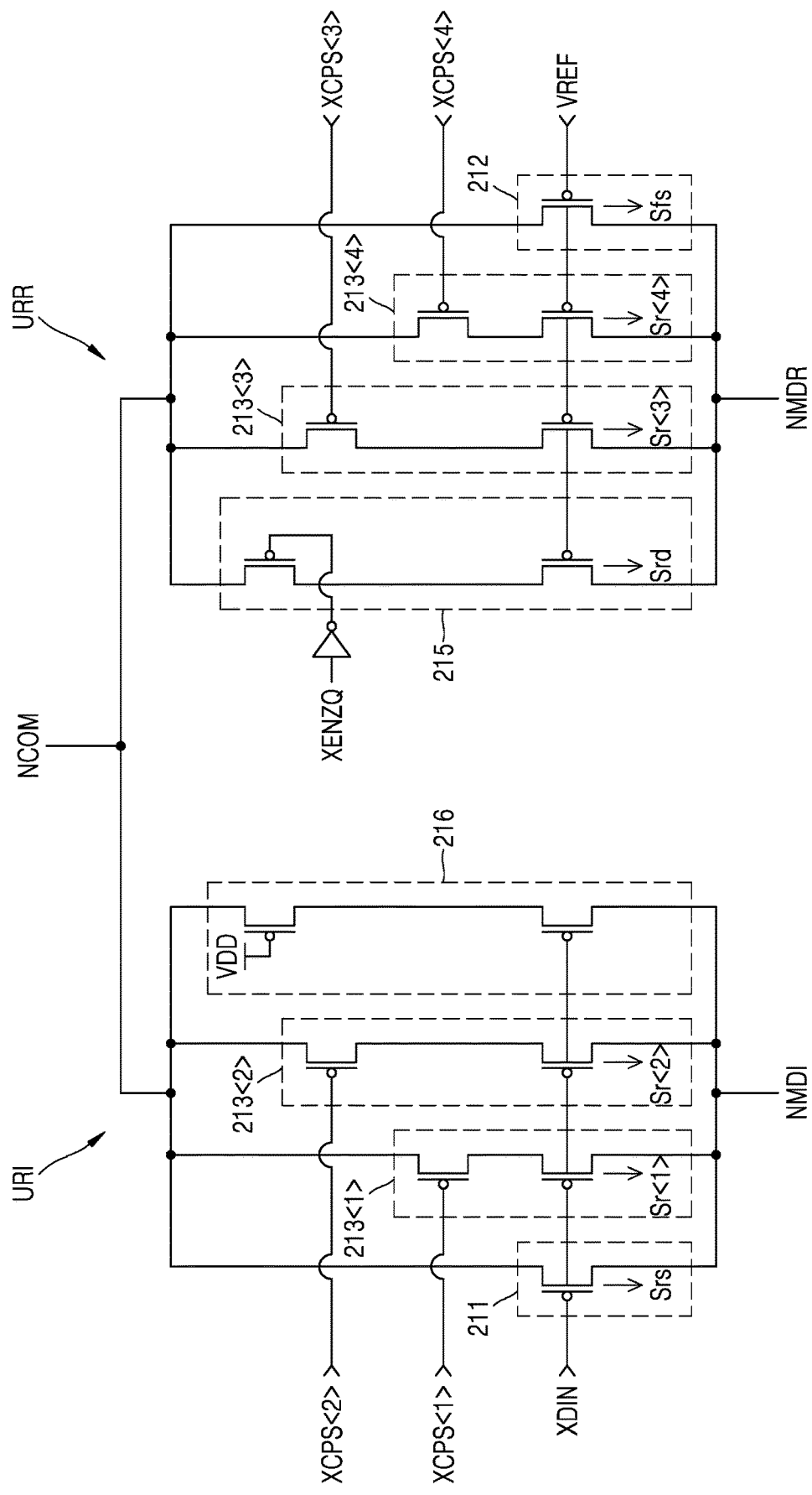
FIG. 5 is a diagram of an equivalent circuit illustrating a reception responding part of FIG. 4.

FIG. 5 is a diagram of an equivalent circuit illustrating the reception responding part 210 of FIG. 4, and specifically shows the reception response unit URI and the reference response unit URR.

Referring to FIG. 5, the reception response unit URI may include a reception basic means (or reception basic portion) 211 and 1-st to a 2-nd response means (or response portions) 213<1> to 213<2>. The reception basic means 211 and the 1-st to the 2-nd response means 213<1> to 213<2> may be disposed or formed in parallel with each other between the common node NCOM and the reception intermediate node NMDI.

The reference response unit URR may include a reference basic means (or reference basic portion) 212 and a 3-rd to a 4-th response means (or response portions) 213<3> to 213<4>. The reference basic means 212 and the 3-rd to the 4-th response means 213<3> to 213<4> may be disposed or formed in parallel with each other between the common node NCOM and the reference intermediate node NMDR.

The reception basic means 211 may have a reception basic conductance Srs. The reception basic conductance Srs may on the voltage of the reception data signal XDIN.

The reference basic means 212 may have a reference basic conductance Sfs. The reference basic conductance Sfs may depend on the level of the reference voltage VREF.

The 1-st to the 4-th response means 213<1> to 213<4> may be enabled in response to activation of "L" of the 1-st to the 4-th calibration signal XCPS<1> to XCPS<4>, respectively. The 1-st to the 4-th response means 213<1> to 213<4> may have 1-st to 4-th response conductances SR<1> to SR<4>, respectively.

Here, the 1-st and the 2-nd response conductance SR<1> and SR<2> may depend on the voltage of the reception data signal XDIN, and the 3-rd and the 4-th response conductance SR<3> and SR<4> may depend on the level of the reference voltage VREF.

The reference response unit URR may further include a precision response means (or precision response portion) 215, and the reception response unit URI may further include a compensation response means (or compensation response portion) 216.

The precision response means 215 may be disposed or formed in parallel with the reference basic means 212 and the 3-rd to the 4-th response means 213<3> to 213<4> between the common node NCOM and the reference intermediate node NMDR. The compensation response means 216 may be disposed or formed in parallel with the reception basic means 211 and the 1-st to the 2-nd response means 213<1> to 213<2> between the common node NCOM and the reception intermediate node NMDI.

The precision response means 215 may be enabled in the calibration mode MOD_C, and disabled in the normal mode MOD_N. The compensation response means 216 may be disabled in both of the calibration mode MOD_C and the normal mode MOD_N.

The precision response means 215 may have a precision conductance Srd. The precision conductance Srd may depend on the level of the reference voltage VREF.

In this embodiment, an example of the 1-st to 4-th response conductances Sr<1> to Sr<4> and the precision conductance Srd is shown in (Table1).

TABLE 1

| Conductance type | Conductance amount |
| --- | --- |
| Sr<1> | 2*Su |
| Sr<2> | 1*Su |
| Sr<3> | 1*Su |
| Sr<4> | 2*Su |
| Srd | 0.5*Su |

Here, 'Su' means 'unit conductance'.

As shown in (Table 1), the 1-st to the 2-nd response conductances Sr<1> to Sr<2> are sequentially decreased in the calibration mode MOD_C, and the 3-rd to the 4-th response conductances Sr<3> to Sr<4> are sequentially increased in the calibration mode MOD_C The 1-st response conductance Sr<1> and the 4-th response conductance Sr<4> may be substantially equal to each other. The 2-nd response conductance Sr<2> and the 3-rd response conductance Sr<3> may be substantially equal to each other.

The precision conductance Srd may be smaller than the 2-nd response conductance Sr<2> and the 3-rd response conductance Sr<3>.

In case that the compensation response means 216 of the reception response unit URI is implemented with transistors having the substantially same shape and size as the precision response means 215 of the reference response unit URR, the occurrence of and offset error due to the provision of the precision response means 215 can be prevented.

In this embodiment, the sum of the reception basic conductance Srs and the 1-st to the 2-nd response conductances Sr<1> to Sr<2> may be understood as the reception response conductance Sinr of the reception response unit URI. The sum of the reference basic conductance Sfs and the 3-rd to the 4-th response conductances Sr<3> to Sr<4> may be understood as the reference response conductance Srfr of the reference response unit URR.

The reception responding part 210 having the above configuration may be enabled in case that the data strobe signal DQSB is activated as "L".

In case that the reference response conductance Srfr is less than the reception response conductance Sinr, the voltage of the reference intermediate node NMDR may be lower than that of the reception intermediate node NMDI.

In case that the reference response conductance Srfr is greater than the reception response conductance Sinr, the voltage of the reference intermediate node NMDR may be higher than that of the reception intermediate node NMDI.

Referring again to FIG. 4, the reception amplifying part 220 may be connected to the reception intermediate node NMDI and the reference intermediate node NMDR. The reception amplifying part 220 may generate a reception preliminary signal XPRI and a reference preliminary signal XPRR.

The reception preliminary signal XPRI and the reference preliminary signal XPRR may be amplified in opposite directions according to a voltage magnitude relationship between the reception intermediate node NMDI and the reference intermediate node NMDR.

In this embodiment, in case that the voltage of the reception intermediate node NMDI is lower than that of the reference intermediate node NMDR, the reception preliminary signal XPRI may be amplified toward the power voltage VDD, and the reference preliminary signal XPRR may be amplified toward a ground voltage VSS.

In case that the voltage of the reception intermediate node NMDI may be higher than that of the reference intermediate node NMDR, the reception preliminary signal XPRI may be amplified toward the ground voltage VSS, and the reference preliminary signal XPRR may be amplified toward the power voltage VDD.

For example, in case that the reference response conductance Srfr is less than the reception response conductance Sinr, the reception preliminary signal XPRI may be amplified toward the power voltage VDD, and the reference preliminary signal XPRR may be amplified toward the ground voltage VSS In case that the reference response conductance Srfr is greater than the reception response conductance Sinr, the reception preliminary signal XPRI may be amplified toward the ground voltage VSS, and the reference preliminary signal XPRR may be amplified toward the power voltage VDD.

In this embodiments, transistors 251, 252, 253 and 254 may control the reference intermediate node NMDR, the reception intermediate node NMDI, the reception preliminary signal XPRI and the reference preliminary signal XPRR as the ground voltage VSS, in case that the data strobe signal DQSB is deactivated to "H".

The reception latch part 230 may receive the reception preliminary signal XPRI and the reference preliminary signal XPRR, and may latch the buffered data signal DBUF.

The reception latch part 230 may include a buffer reception unit (or buffer reception part) 231 and a buffer latch unit (or a buffer latch part) 233.

The buffer reception unit 231 may generate a reception buffer signal XBFI and a reference buffer signal XBFR with buffering the reception preliminary signal XPRI and the reference preliminary signal XPRR.

The buffer latch unit 233 may receive the reception buffer signal XBFI and the reference buffer signal XBFR, and may generate the buffered data signal DBUF. The buffered data signal DBUF may have a logic state corresponding to the logic state of the reception buffer signal XBFI and the reference buffer signal XBFR.

The logic states of the reception buffer signal XBFI and the reference buffer signal XBFR may be latched by the buffer latch unit 233 in the inactivation of "H" of the data strobe signal DQSB.

According to the reception latch part 230 as described above, the buffered data signal DBUF may have a logic state according to the voltage magnitude relationship between the reception preliminary signal XPRI and the reference preliminary signal XPRR.

In this embodiment, in case that the voltage of the reception preliminary signal XPRI is higher than that of the reference preliminary signal XPRR, the buffered data signal DBUF may have the logic state of "L".

In case that the voltage of the reference preliminary signal is higher than that of XPRR the reception preliminary signal XPRI, the buffered data signal DBUF may have the logic state of "H".

For example, in case that the reception response conductance Sinr is greater than the reference response conductance Srfr, the buffered data signal DBUF may have the logic state of "L". In case that the reference response conductance Srfr is greater than the reception response conductance Sinr, the buffered data signal DBUF may have the logic state of "H".

As a result, in the reception circuit 200, the buffered data signal DBUF may have a logic state depending on the magnitude relationship between the reception response conductance Sinr and the reference response conductance Srfr in the calibration mode MOD_C.

Referring again to FIG. 1, the code generating circuit 300 may generate a calibration code CDCA. There may be 1-st to 4-th calibration signals XCPS<1> to XCPS<4> in the calibration code CDCA. The 1-st to the 4-th calibration signals XCPS<1> to XCPS<4> may be sequentially activated.

Figure 6:
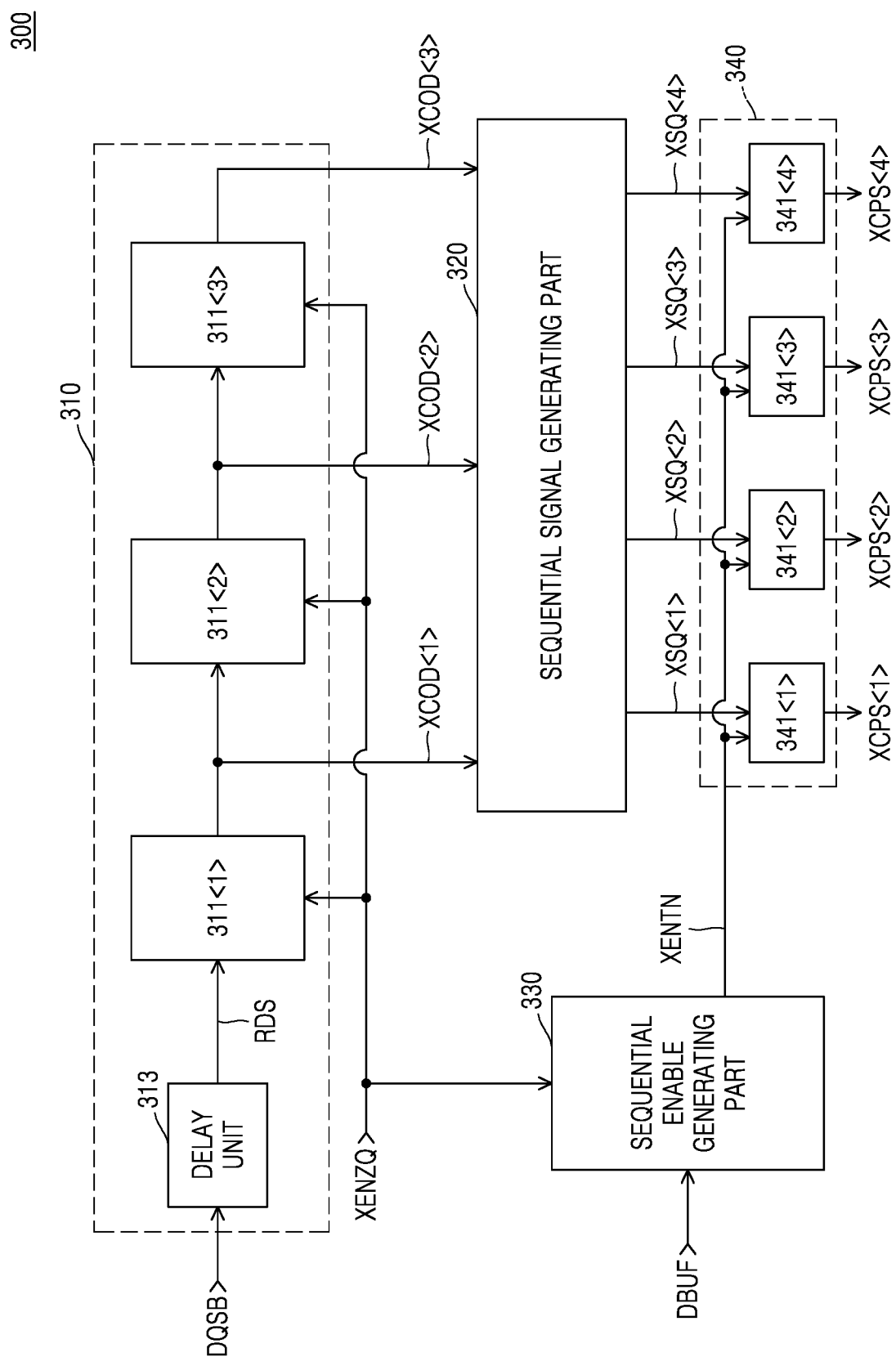
FIG. 6 is a diagram of an equivalent circuit illustrating the code generating circuit of FIG. 1.

FIG. 6 is a diagram of an equivalent circuit illustrating the code generating circuit 300 of FIG. 1. Referring to FIG. 6, the code generating circuit 300 includes a coding generating part 310, a sequential signal generating part 320, a sequential enable generating part 330 and a calibration signal generating part 340.

The coding generating part 310 may generate q coding signal(s). Here, 'q' is a natural number, and the 'n' is less than or equal to the power of 'q' of '2'. In this embodiment, 'q' is '3'. For example, the coding generating part 310 may generate 1-st to 3-rd coding signals XCOD<1> to XCOD<3>.

The coding generating part 310 may include 1-st to 3-rd coding generating units (or coding generating parts) 311<1> to 311<3> to generate the 1-st to the 3-rd coding signals XCOD<1> to XCOD<3>. The coding generating part 310 may further include a delay unit 313.

The delay unit 313 may generate an inversion delay signal RDS with phase-delaying the inverted signal of the data strobe signal DQSB. The inversion delay signal RDS may be provided to the 1-st coding generating unit 311<1>.

The operation stability of the data input buffer of the disclosure can be improved through the delay unit 313. However, in this specification, for clarity of understanding, consideration of the delay of the data strobe signal DQSB by the delay unit 313 is excluded.

Next, the 1-st to the 3-rd coding generating units 311<1> to 311<3> are specifically described.

Figure 7:
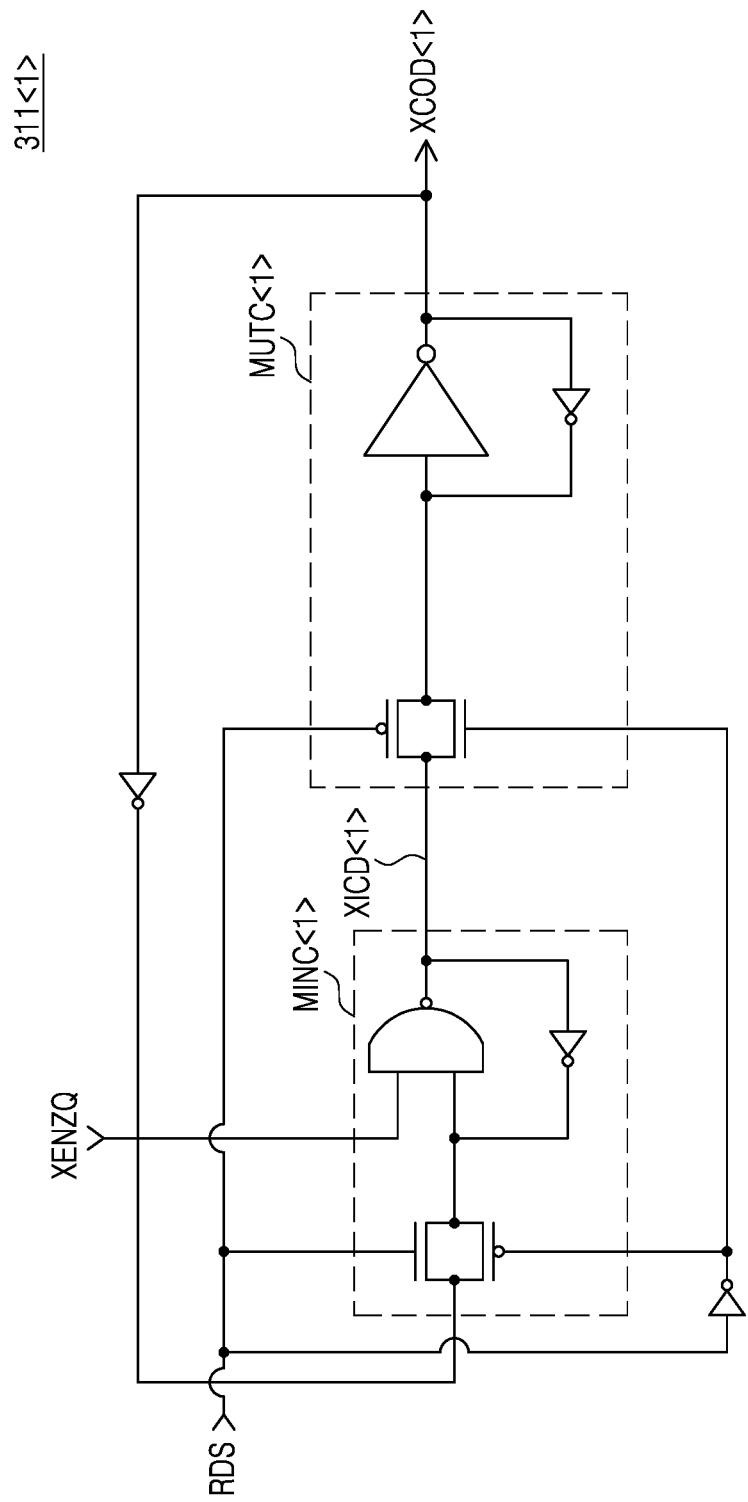
FIG. 7 and FIG. 8 are schematic diagrams of equivalent circuits illustrating coding generating units of FIG. 6.

FIG. 7 is a schematic diagram of an equivalent circuit illustrating the 1-st coding generating unit 311<1> of FIG. 6. Referring to FIG. 7, the 1-st coding generating unit 311<1> may include a 1-st input code means (or input code portion) MINC<1> and a 1-st output code means (or output code portion) MUTC<1>.

The 1-st input code means MINC<1> may receive the inverted signal of the 1-st coding signal XCOD<1>, and may generate a 1-st input code signal XICD<1>. The 1-st input code signal XICD<1> may be controlled to a logic state that is inverted from the inverted signal of the 1-st coding signal XCOD<1> in response to transition to "H" of the inversion delay signal RDS, for example, in response to transition to "L" of the data strobe signal DQSB. Also, the 1-st input code signal XICD<1> may be latched as "H" in response to deactivation of the calibration enable signal XENEQ.

In this specification, the logic state of "H" may be referred to as a 'first logic state', and the logic state of "L" may be referred to as a 'second logic state'.

The 1-st output code means MUTC<1> may generate the 1-st coding signal XCOD<1> with inverting the 1-st input code signal XICD<1> in response to transition to "L" of the inversion delay signal RDS, for example, in response to transition to "H" of the data strobe signal DQSB.

Figure 8:
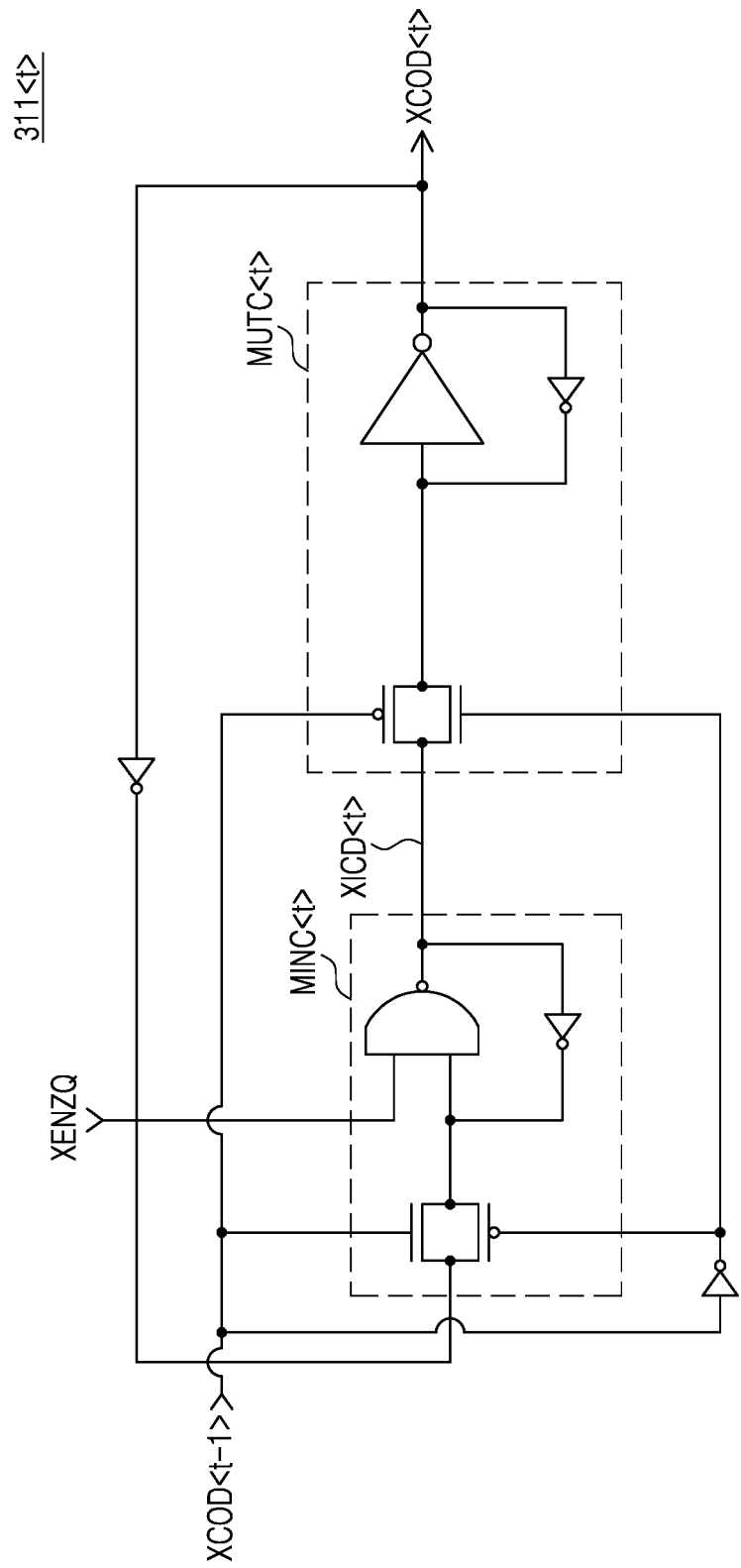

FIG. 8 is a diagram illustrating a t-th coding generating unit (or coding generating part) 311<t> of FIG. 6. Here, 't' may be a natural number from 2 to 3. Referring to FIG. 8, the t-th coding generating unit 311<t> may include a t-th input code means (or input code portion) MINC<t> and a t-th output code means (or output code portion) MUTC<t>.

The t-th input code means MINC<t> may receive the inverted signal of a t-th coding signal XCOD<t>, and may generate a t-th input code signal XICD<t>. The t-th input code signal XICD<t> may be controlled to a logic state that is inverted from the inverted signal of the t-th coding signal XCOD<t> in response to transition to "H" of an (t−1)-th coding signal XCOD<t−1>. The 1-st input code signal XICD<1> may be latched as "H" in response to deactivation of the calibration enable signal XENEQ.

The t-th output code means MUTC<t> may generate the t-th coding signal XCOD<t> with inverting the t-th input code signal XICD<t> in response to transition to "L" of the (t−1)-th coding signal XCOD<t−1>.

Figure 9:
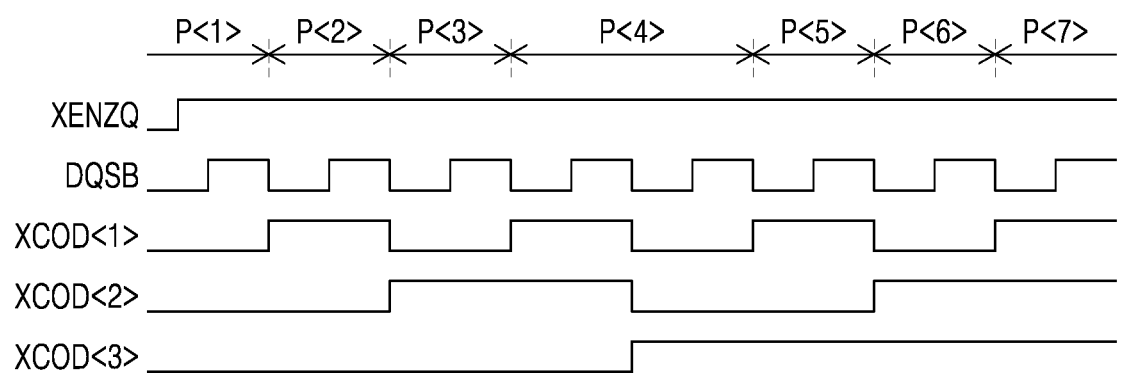
FIG. 9 is a schematic diagram illustrating signals related to a coding generating part of FIG. 6.

In summary, the coding generating part 310 may be enabled according to the activation of the calibration enable signal XENEQ to "H". As shown in FIG. 9, the 1-st coding signal XCOD<1> may alternately rise and fall according to the pulse generation of the data strobe signal DQSB. A 2-nd coding signal XCOD<2> may alternately rise and fall according to the pulse generation of the 1-st coding signal XCOD<1>, and the 3-rd coding signal XCOD<3> may alternately rise and fall according to the pulse generation of the 2-nd coding signal XCOD<2>.

Referring again to FIG. 6, the sequential signal generating part 320 may generate 1-st to 4-th sequential signals XSQ<1> to XSQ<4> with using the 1-st to the 3-rd coding signals XCOD<1> to XCOD<3>.

Figure 10:
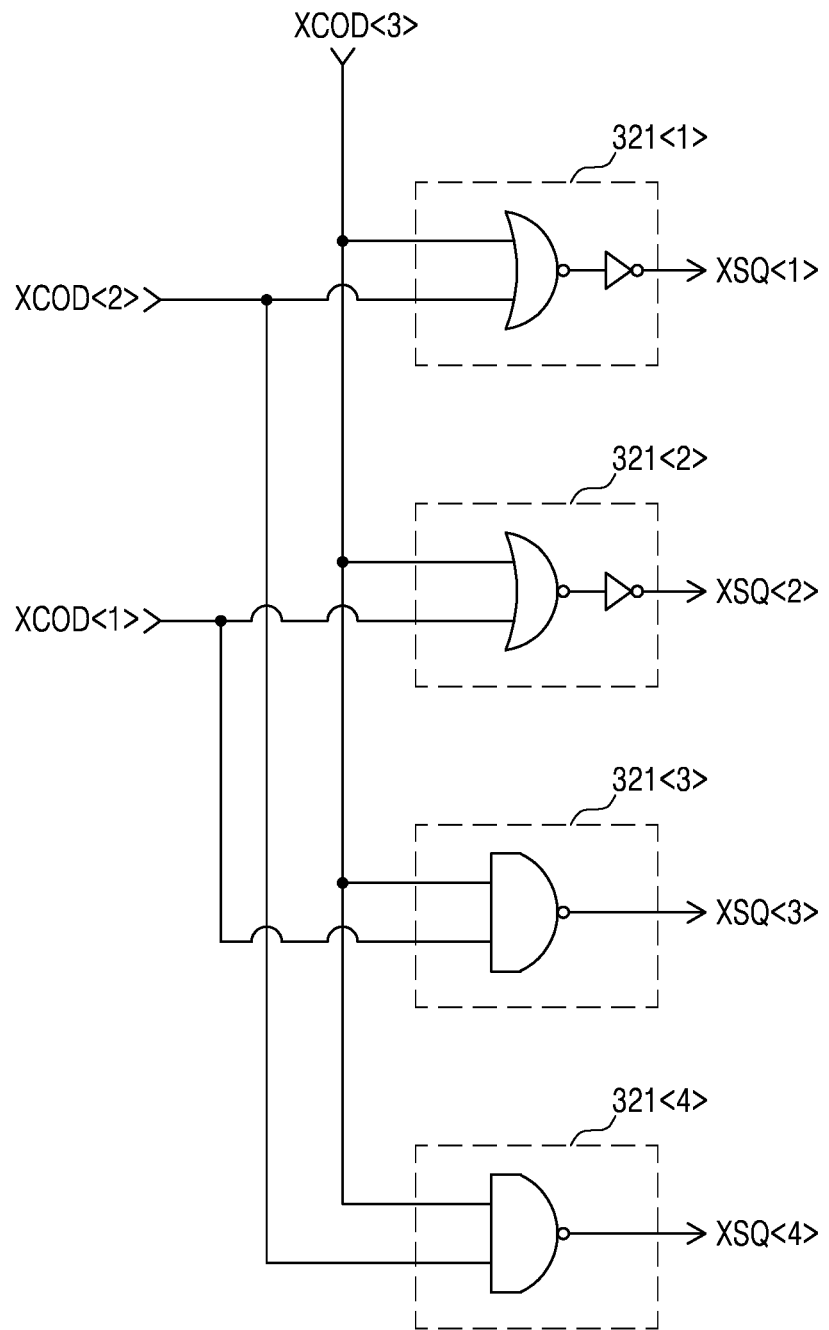
FIG. 10 is a schematic diagram of an equivalent circuit illustrating a sequential signal generating part of FIG. 6.

FIG. 10 is a schematic diagram of an equivalent circuit illustrating the sequential signal generating part 320 of FIG. 6. Referring to FIG. 10, the sequential signal generating part 320 1-st to 4-th sequential generating units (or sequential generating parts) 321<1> to 321<4>.

The 1-st sequential generating unit 321<1> may generate a 1-st sequential signal XSQ<1> with performing an OR operation on the 3-rd coding signal XCOD<3> and the 2-nd coding signal XCOD<2>.

The 2-nd sequential generating unit 321<2> may generate a 2-nd sequential signal XSQ<2> with performing an OR operation on the 3-rd coding signal XCOD<3> and the 1-st coding signal XCOD<1>.

The 3-rd sequential generating unit 321<3> may generate a 3-rd sequential signal XSQ<3> with performing a NAND operation on the 3-rd coding signal XCOD<3> and the 1-st coding signal XCOD<1>.

The 4-th sequential generating unit 321<2> may generate a 4-th sequential signal XSQ<4> with performing a NAND operation on the 3-rd coding signal XCOD<3> and the 2-nd coding signal XCOD<2>.

Figure 11:
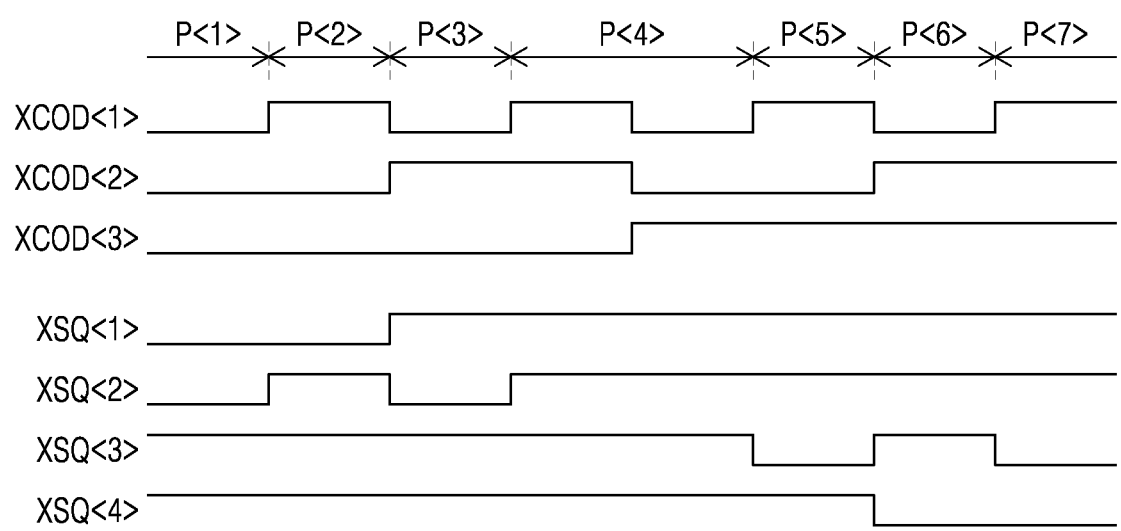
FIG. 11 is a schematic diagram illustrating signals related to the sequential signal generating part of FIG. 6.

According to the sequential signal generating part 320 as described above, as shown in FIG. 11, the 1-st to the 4-th sequential signals XSQ<1> to XSQ<4> may be sequentially activated as "L".

Specifically, in the first section P<1>, the 1-st sequential signal XSQ<1> and the 2-nd sequential signal XSQ<2> may be in the activated state of "L", and the 3-rd sequential signal XSQ<3> and the 4-th sequential signal XSQ<3> may be in the inactivated state of "H".

In the second section P<2>, the 1-st sequential signal XSQ<1> is activated as "L", and the 2-nd to the 4-th sequential signals XSQ<2> to XSQ<4> are deactivated as "H".

In the third section P<3>, the 2-nd sequential signal XSQ<2> may be activated as "L", and the 1-st signal XSQ<1>, the 3-rd to the 4-th sequential signals XSQ<3> to XSQ<4> are deactivated as "H".

In the fourth section P<4>, the 1-rd to the 4-th sequential signals XSQ<1> to XSQ<4> are all deactivated as "H".

In the fifth section P<5>, the 3-rd sequential signal XSQ<3> may be activated as "L", and the 1-st to the 2-nd sequential signals XSQ<1> to XSQ<2> and the 4-th sequential signal XSQ<4> may be deactivated as "H".

In the sixth section P<6>, the 4-th sequential signal XSQ<4> may be activated as "L", and the 1-st to the 3-rd sequential signals XSQ<1> to XSQ<3> are deactivated as "H".

In the seven section P<7>, the 3-rd sequential signal XSQ<3> and the 4-th sequential signal XSQ<4> are activated as "L", and the 1-st sequential signal XSQ<1> and the 2-nd sequential signal XSQ<2> are deactivated as "H".

Referring again to FIG. 6, the sequential enable generating part 330 may generate a sequential enable signal XENTN.

Figure 12:
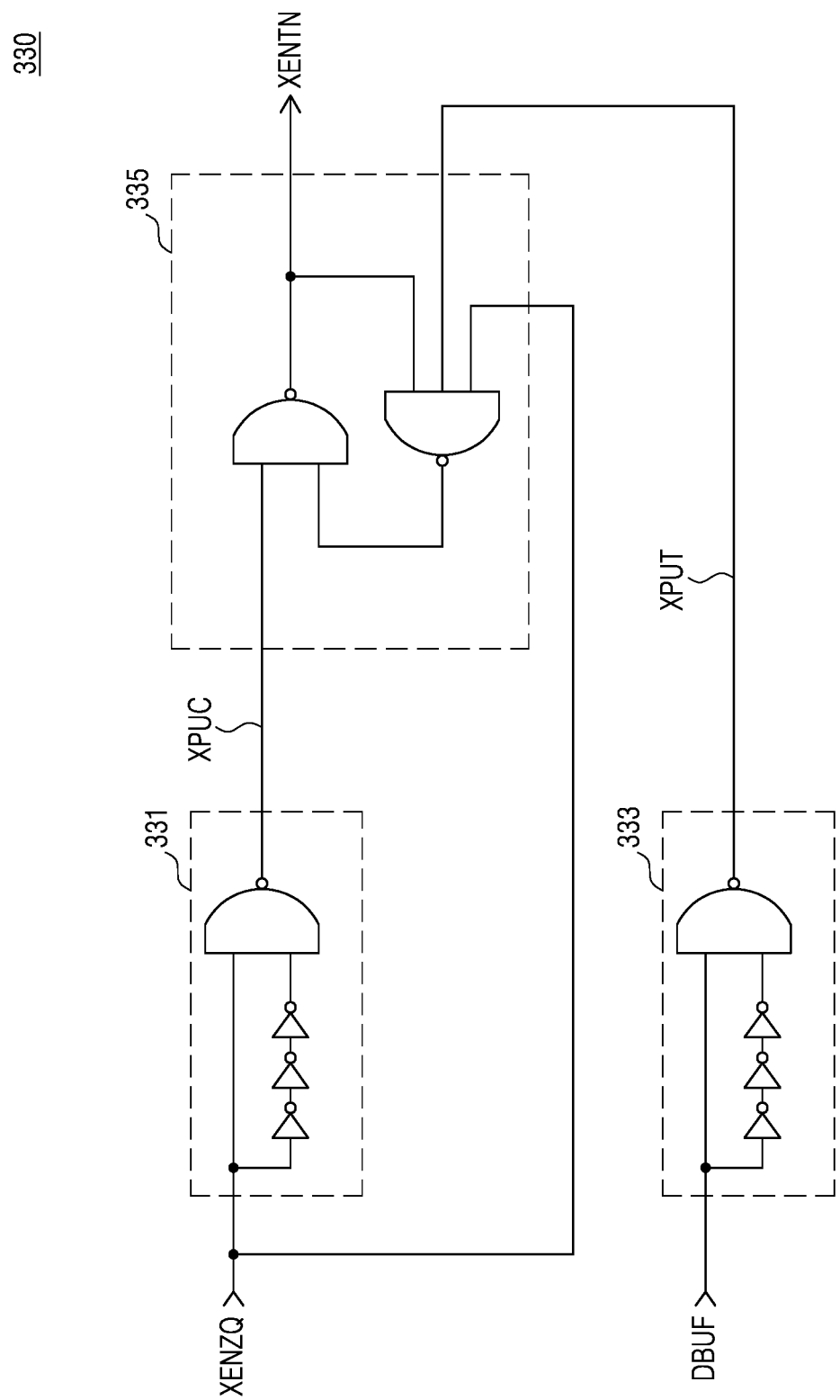
FIG. 12 is a schematic diagram of an equivalent circuit illustrating a sequential enable generating part of FIG. 6.

FIG. 12 is a schematic diagram of an equivalent circuit illustrating the sequential enable generating part 330 of FIG. 6. Referring to FIG. 12, the sequential enable generating part 330 may include a calibration pulse generating unit (or calibration pulse generating part) 331, a transition signal generating unit (or transition signal generating part) 333 and a sequential enable generating unit 335.

Figure 14:
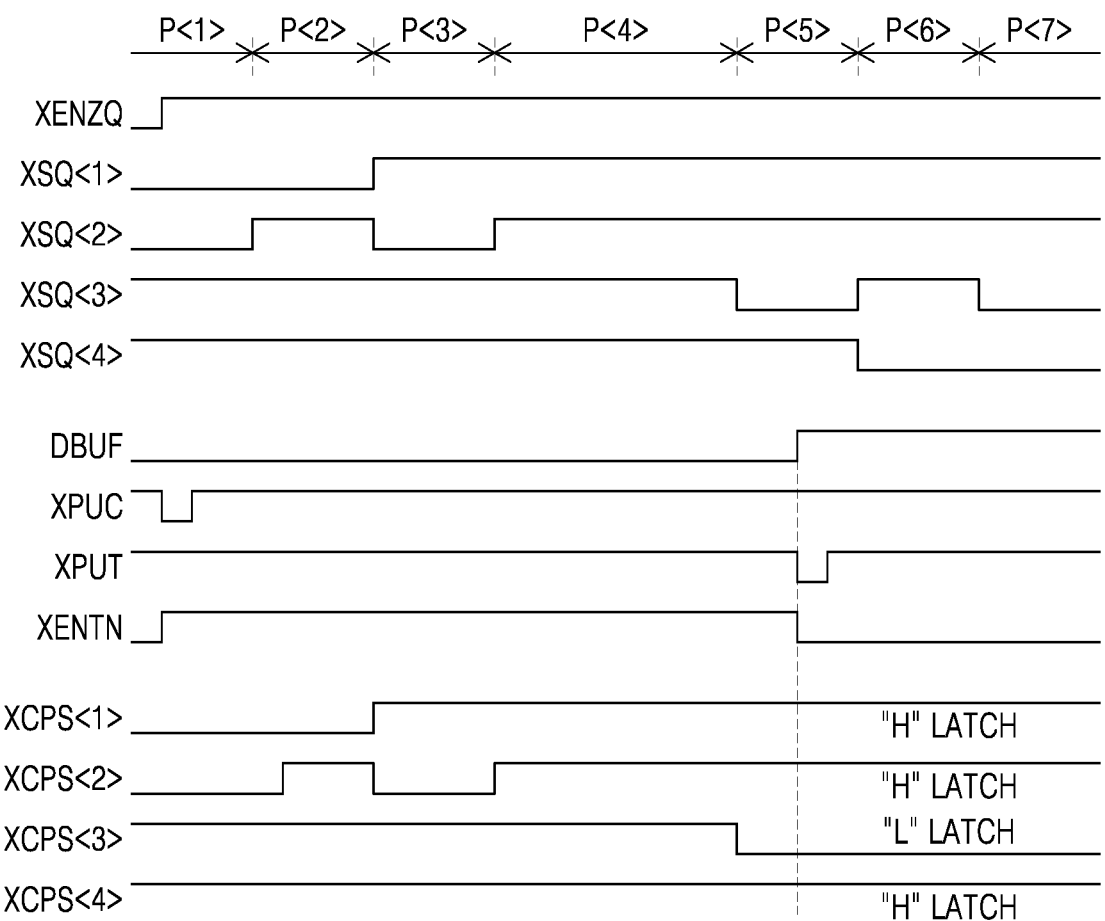
FIG. 14 is a schematic timing diagram for explaining a process in which a calibration code is determined in the data input buffer of FIG. 1.

The calibration pulse generating unit 331 may generate a calibration pulse XPUC. The calibration pulse XPUC may be activated as "L" in response to activation of "H" of the calibration enable signal XENZQ. Refer to FIG. 14.

The transition signal generating unit 333 may generate a transition pulse XPUT. The transition pulse XPUT may be activated as "L" in response to transition from "L" to "H" of the buffered data signal DBUF. Refer to FIG. 14.

The sequential enable generating unit 335 may generate the sequential enable signal XENTN. The sequential enable signal XENTN may be activated to "H" in response to a pulse generation of the calibration pulse XPUC, and is deactivated to "L" in response to a pulse generation of the transition pulse XPUT.

For example, the sequential enable signal XENTN may be activated to "H" in response to activation of "H" of the calibration enable signal XENZQ, and the calibration enable signal may be deactivated to "L" in response to the transition from "L" to "H" of the buffered data signal DBUF, as shown in FIG. 14.

Referring again to FIG. 6, the calibration signal generating part 340 may generate 1-st to 4-th calibration signals XCPS<1> to XCPS<4> with receiving the 1-st to the 4-th sequential signals XSQ<1> to XSQ<4>.

The calibration signal generating part 340 may include 1-st to 4-th calibration generating units (or calibration generating parts) 341<1> to 341<4> to generate the 1-st to the 4-th calibration signals XCPS<1> to XCPS<4>.

Figure 13:
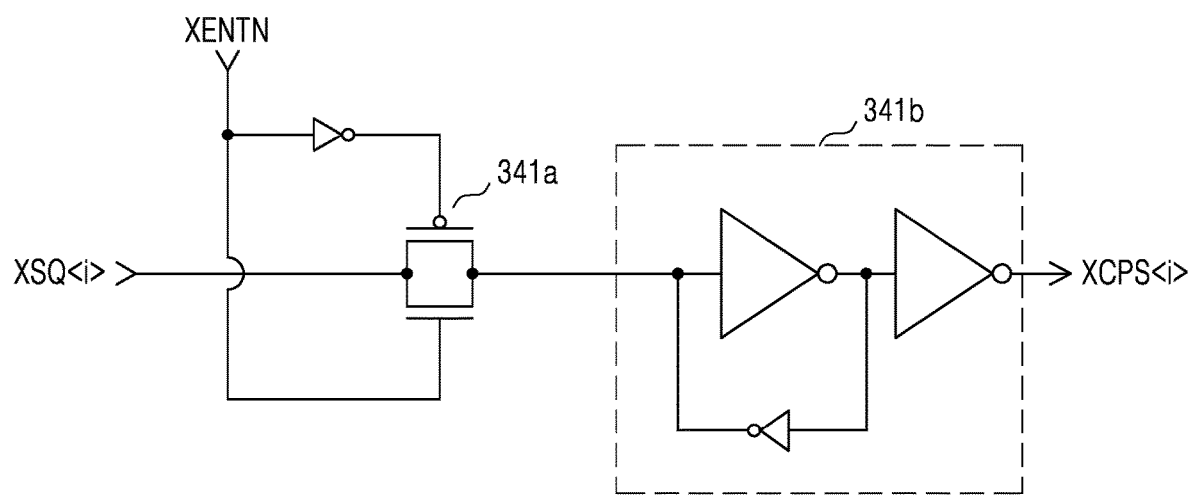
FIG. 13 is a schematic diagram of an equivalent circuit illustrating one of calibration generating units of FIG. 6.

FIG. 13 is a schematic diagram of an equivalent circuit illustrating one of calibration generating units of FIG. 6, and shows an i-th calibration generating unit 341<i>.

Referring to FIG. 13, the i-th calibration generating unit 341<i> may include a calibration switch 341a and a calibration latch means 341b.

The calibration switch 341a may transmit the i-th sequential signal XSQ<i> to the calibration latch means 341b in case that the sequential enable signal XENTN is activated as "H".

The calibration latch means 341b may generate an i-th calibration signal XCPS<i>. The logic state of the i-th calibration signal XCPS<i> may correspond to the logic state of the i-th sequential signal XSQ<i>, which is transmitted through the calibration switch 341a. The logic state of the i-th calibration signal XSQ<i> may be latched according to deactivation of "L" of the sequential enable signal XENTN.

For example, in case that the sequential enable signal XENTN is activated, the logic state of the i-th calibration signal XCPS<i> may be the same as that of the i-th sequential signal XSQ<i>. The logic state of the i-th calibration signal XSQ<i> may be latched according to deactivation of "L" of the sequential enable signal XENTN.

As a result, according to the code generating circuit 300, as can be seen from FIG. 14, the calibration code CDCA may be sequentially changed in the calibration mode MOD_C, and may be latched in response to the transition from "L" to "H" of the buffered data signal DBUF.

Next, an offset calibration process in the data input buffer of the disclosure will be described.

First, the change in the logic state of the calibration signals XCPS for each section and the relative magnitudes between the reception response conductance Sinr and the reference response conductance Srfr are as shown in (Table 2).

Here, it is understood that the change in the logic state of the calibration signals XCPS for each section may mean the sequential change of the calibration code CDCA for each section.

TABLE 2

| section | XCPS<1> | XCPS<2> | XCPS<3> | XCPS<4> | Relative magnitude of Conductance |
|---|---|---|---|---|---|
| P<1> | L | L | H | H | (−)2.5*Sun |
| P<2> | L | H | H | H | (−)1.5*Sun |
| P<3> | H | L | H | H | (−)0.5*Sun |
| P<4> | H | H | L | H | (+)0.5*Sun |
| P<5> | H | H | L | H | (+)1.5*Sun |
| P<6> | H | H | H | L | (+)2.5*Sun |
| P<7> | H | H | L | L | (+)3.5*Sun |

Here, a sign (−) means that the reception response conductance Sinr is greater than the reference response conductance Srfr, and a sign (+) means that the reference response conductance Srfr is greater than the reception response conductance Sinr.

As can be seen from (Table 2), in the data input buffer of the disclosure, the relative magnitude of the reference response conductance Srfr with respect to the reception response conductance Sinr may be sequentially changed according to the sequential change of the calibration code CDCA, in the calibration mode MOD_C.

In FIG. 14, it is assumed that the buffered data signal DBUF transits from "L" to "H" in a fifth section P<5>.

In this case, by the 1-st to the 4-th calibration generating units 341<1> to 341<4>, the logic states of the 1-st to the 4-th calibration signals XCPS<1> to XCPS<4> in the fifth section P<5> may be latched.

Subsequently, the effect of the precision response means 215 having the precision conductance Srd in the data input buffer of the disclosure will be examined.

First, it is assumed that the data input buffer of the disclosure does not include the precision response means 215.

In this case, in the normal mode MOD_N, the maximum difference between the reception response conductance Sinr and the reference response conductance Srfr is 1*Sun.

However, in case of the data input buffer of the disclosure, in the normal mode MOD_N in which the precision response means 215 is disabled, the maximum difference between the reception response conductance Sinr and the reference response conductance Srfr may be decreased to 0.5*Sun.

For example, by the precision response means 215 having the precision conductance Srd, the error in the offset calibration in the data input buffer of the disclosure can be reduced.

In summary, in the data input buffer of the disclosure, the reception data signal XDIN is electrically connected to the reference voltage VREF. Accordingly, the voltage of the reception data signal XDIN induced to the reception response unit URI and the reference voltage VREF induced to the reference response unit URR may be at the same level.

The calibration code CDCA may be sequentially changed, and the transition of the buffered data signal DBUF may be monitored. At the transition point from "L" to "H" of the buffered data signal DBUF, the calibration code CDCA may be stored, and thereby the offset may be calibrated.

According to the data input buffer of the disclosure, the time required for offset calibration may be significantly reduced, compared with the conventional data input buffer that sets the code value of the calibration code CDCA and changes the voltage level of the reception data signal XDIN in a direction.

For example, according to the data input buffer of the disclosure, the offset can be calibrated very effectively.

While the disclosure has been described with reference to the embodiments shown in the drawings, these embodiments are merely illustrative and it should be understood that various modifications and other equivalent embodiments can be derived by those skilled in the art on the basis of the embodiments.

It will be apparent to those skilled in the art that various modifications can be made to the above-described embodiments of the disclosure without departing from the spirit or scope of the disclosure. Thus, it is intended that the disclosure covers all such modifications provided they come within the scope of the appended claims and their equivalents.

What is claimed is:

1. A data input buffer comprising:
a switching circuit that controls a voltage of a reception input signal and a reference voltage to a substantially same level in a calibration mode in which a calibration enable signal is activated;
a reception circuit that includes a reception response unit and a reference response unit, and generates a buffered data signal, wherein the reception response unit has a reception response conductance which depends on the voltage of the reception input signal, the reference response unit has a reference response conductance which depends on a level of the reference voltage, and the buffered data signal has a logic state depending on a magnitude relationship between the reception response conductance and the reference response conductance in the calibration mode; and
a code generating circuit that generates a calibration code including 1-st to n-th calibration signals sequentially activated, wherein the calibration code is sequentially changed in the calibration mode, and is latched in response to a transition of the buffered data signal, 'n' being a natural number equal to greater than 2, wherein
the data input buffer buffers a reception data signal to generate the buffered data signal, the reception data signal being an analog signal, and the buffered data signal being a digital signal, and
a relative magnitude of the reference response conductance with respect to the reception response conductance is sequentially changed according to a sequential change of the calibration code, in the calibration mode.

2. The data input buffer of claim 1, wherein the switching circuit includes:
an equalization switch that is disposed between the reception data signal and the reference voltage, and is turned-on in the calibration mode.

3. The data input buffer of claim 1, wherein the switching circuit includes:
a normal reception switch that electrically connects the reception data signal to a data pad in a normal mode in which the calibration enable signal is deactivated, wherein the data pad receives an external data signal provided from an outside;
a normal reference switch that electrically connects the reference voltage to a set voltage in the normal mode;
a reception equalization switch that electrically connects the reception data signal to a biasing voltage in the calibration mode; and
a reference equalization switch that electrically connects the reference voltage to the biasing voltage in the calibration mode.

4. The data input buffer of claim 1, wherein
the reception circuit is enabled in response to activation of a data strobe signal, and
the reception circuit includes:
a reception responding part that includes the reception response unit and the reference response unit, wherein the reception response unit is disposed between a common node and a reception intermediate node, the reference response unit is disposed between the common node and a reference intermediate node, and the common node is electrically connected to a power voltage according to activation of the data strobe signal;
a reception amplifying part that is electrically connected to the reception intermediate node and the reference intermediate node, and generates a reception preliminary signal and a reference preliminary signal, wherein the reception preliminary signal and the reference preliminary signal are amplified in opposite directions according to a voltage magnitude relationship between the reception intermediate node and the reference intermediate node; and
a reception latch part that receives the reception preliminary signal and the reference preliminary signal, and latches the buffered data signal, wherein the buffered data signal has a logic state according to the voltage magnitude relationship between the reception preliminary signal and the reference preliminary signal.

5. The data input buffer of claim 4, wherein the reception circuit further includes:
an enable transistor that is disposed between the power voltage and the common node, and electrically connects the common node to the power voltage in response to activation of the data strobe signal.

6. The data input buffer of claim 4, wherein
the reception response unit includes a reception basic means and 1-st to p-th response portions disposed in parallel with each other between the common node and the reception intermediate node, 'p' being a natural number smaller than n,
the reception basic portion has a reception basic conductance depending on the voltage of the reception data signal,
the 1-st to p-th response portions are enabled in response to activation of 1-st to p-th calibration signals, respectively, and have 1-st to p-th response conductances depending on the voltage of the reception data signal, and
the reference response unit includes a reference basic portion and (p+1) to n-th response portions disposed in parallel with each other between the common node and the reference intermediate node,
the reference basic portion has a reference basic conductance depending on the level of the reference voltage, and
the (p+1)-th to n-th response portions are enabled in response to activation of (p+1)-th to n-th calibration signals, respectively, and have (p+1)-th to n-th response conductances depending on the level of the reference voltage.

7. The data input buffer of claim 6, wherein the
the 1-st to p-th response conductances are sequentially decreased in the calibration mode, and
the (p+1)-th to n-th response conductances are sequentially increased in the calibration mode.

8. The data input buffer of claim 7, wherein the reference response unit further includes:

a precision response portion that is disposed in parallel with the reference basic portion and the (p+1)-th to n-th response portions between the common node and the reference intermediate node, enabled in the calibration mode, and has a precision conductance depending on the level of the reference voltage, the precision conductance being smaller than the (p+1)-th response conductance.

9. The data input buffer of claim 8, wherein the reception response unit further includes:
a compensation response portion that is disposed in parallel with the reception basic portion and the 1-st to p-th response portions between the common node and the reception intermediate node, and is disenabled in the calibration mode.

10. The data input buffer of claim 4, wherein
the reception latch part includes:
a buffer reception unit that generates a reception buffer signal and a reference buffer signal with buffering the reception preliminary signal and the reference preliminary signal; and
a buffer latch unit that receives the reception buffer signal and the reference buffer signal, and generates the buffered data signal, wherein the buffered data signal has a logic state corresponding to the logic state of the reception buffer signal and the reference buffer signal, and
the logic states of the reception buffer signal and the reference buffer signal are latched by the buffer latch unit according to an inactivation of the data strobe signal.

11. The data input buffer of claim 1, wherein
the 'n' is less than or equal to '2' to the power of 'q', 'q' being a natural number, and
the code generating circuit includes:
a coding generating part that generates 1-st to q-th coding signals, wherein the 1-st coding signal alternately rises and falls according to a pulse of a data strobe signal, the data strobe signal is a pulse signal that is periodically and repeatedly activated in the calibration mode, and a t-th coding signal alternately rises and falls according to a pulse of a (t−1)-th coding signal, 't' being a natural number from 2 to q;
a sequential signal generating part that generates 1-st to n-th sequential signals with using the 1-st to q-th coding signals, wherein the 1-st to n-th sequential signals are sequentially activated;
a sequential enable generating part that generates a sequential enable signal, wherein the sequential enable signal is activated in response to activation of a calibration enable signal, and the calibration enable signal is deactivated in response to the transition of the buffered data signal; and
a calibration signal generating part that generates 1-st to n-th calibration signals with receiving the 1-st to n-th sequential signals, wherein the logic state of an i-th calibration signal corresponds to the logic state of an i-th sequential signal during activation of the sequential enable signal, and is latched in response to deactivation of the sequential enable signal, 'i' being a natural number from 1 to n.

12. The data input buffer of claim 11, wherein the coding generating part includes 1-st to q-th coding generating units that generates the 1-st to q-th coding signals.

13. The data input buffer of claim 12, wherein the 1-st coding generating unit includes:

a 1-st input code portion that receives the inverted signal of the 1-st coding signal and generates a 1-st input code signal, wherein the 1-st input code signal is controlled to a logic state that is inverted from the inverted signal of the 1-st coding signal in response to an one-way transition of the data strobe signal with a delay, and is latched as a first logic state in response to deactivation of the calibration enable signal; and
a 1-st output code portion that generates the 1-st coding signal with inverting the 1-st input code signal in response to other one-way transition of the data strobe signal.

14. The data input buffer of claim 12, wherein the t-th coding generating unit includes:
a t-th input code portion that receives the inverted signal of the t-th coding signal and generates a t-th input code signal, wherein the t-th input code signal is controlled to a logic state that is inverted from the inverted signal of the t-th coding signal in response to an one-way transition of the (t−1)-th coding signal, and is latched as a first logic state in response to deactivation of the calibration enable signal; and
a t-th output code portion that generates the t-th coding signal with inverting the t-th input code signal in response to another one-way transition of the (t−1)-th coding signal.

15. The data input buffer of claim 11, wherein the sequential enable generating part includes:
a calibration pulse generating unit that generates a calibration pulse in response to activation of the calibration enable signal;
a transition signal generating unit that generates a transition pulse in response to transition of the buffered data signal; and
a sequential enable generating unit that generates the sequential enable signal, wherein the sequential enable signal is activated in response to a pulse generation of the calibration pulse, and is deactivated in response to a pulse generation of the transition pulse.

16. The data input buffer of claim 11, wherein
the calibration signal generating part includes 1-st to n-th calibration generating units, and
an i-th calibration generating unit includes:
a calibration switch that transmits the i-th sequential signal in case that the sequential enable signal is activated; and
a calibration latch portion that generates an i-th calibration signal, wherein the logic state of the i-th calibration signal corresponds to that of the i-th sequential signal transmitted through the calibration switch, and the logic state of the i-th calibration signal is latched according to deactivation of the sequential enable signal.

17. A memory device comprising:
a data input buffer comprising:
a switching circuit that controls a voltage of a reception input signal and a reference voltage to a substantially same level in a calibration mode in which a calibration enable signal is activated;
a reception circuit that includes a reception response unit and a reference response unit, and generates a buffered data signal, wherein the reception response unit has a reception response conductance which depends on the voltage of the reception input signal, the reference response unit has a reference response conductance which depends on a level of the reference voltage, and the buffered data signal has a logic state depending on a magnitude relationship between the reception response conductance and the reference response conductance in the calibration mode; and a code generating circuit that generates a calibration code including 1-st to n-th calibration signals sequentially activated, wherein the calibration code is sequentially changed in the calibration mode, and is latched in response to a transition of the buffered data signal, being a natural number equal to greater than 2, wherein the data input buffer buffers a reception data signal to generate the buffered data signal, the reception data signal being an analog signal, and the buffered data signal being a digital signal, and a relative magnitude of the reference response conductance with respect to the reception response conductance is sequentially changed according to a sequential change of the calibration code, in the calibration mode.

18. The memory device of claim 17, wherein
the reception circuit is enabled in response to activation of a data strobe signal, and
the reception circuit includes:
   a reception responding part that includes the reception response unit and the reference response unit, wherein the reception response unit is disposed between a common node and a reception intermediate node, the reference response unit is disposed between the common node and a reference intermediate node, and the common node is electrically connected to a power voltage according to activation of the data strobe signal;
   a reception amplifying part that is electrically connected to the reception intermediate node and the reference intermediate node, and generates a reception preliminary signal and a reference preliminary signal, wherein the reception preliminary signal and the reference preliminary signal are amplified in opposite directions according to a voltage magnitude relationship between the reception intermediate node and the reference intermediate node; and
   a reception latch part that receives the reception preliminary signal and the reference preliminary signal, and latches the buffered data signal, wherein the buffered data signal has a logic state according to the voltage magnitude relationship between the reception preliminary signal and the reference preliminary signal.

19. The memory device of claim 18, wherein
the reception response unit includes a reception basic means and 1-st to p-th response portions disposed in parallel with each other between the common node and the reception intermediate node, 'p' being a natural number smaller than n,
the reception basic portion has a reception basic conductance depending on the voltage of the reception data signal,
the 1-st to p-th response portions are enabled in response to activation of 1-st to p-th calibration signals, respectively, and have 1-st to p-th response conductances depending on the voltage of the reception data signal, and
the reference response unit includes a reference basic portion and (p+1) to n-th response portions disposed in parallel with each other between the common node and the reference intermediate node,
the reference basic portion has a reference basic conductance depending on the level of the reference voltage, and
the (p+1)-th to n-th response portions are enabled in response to activation of (p+1)-th to n-th calibration signals, respectively, and have (p+1)-th to n-th response conductances depending on the level of the reference voltage.

20. The memory device of claim 19, wherein the
the 1-st to p-th response conductances are sequentially decreased in the calibration mode, and
the (p+1)-th to n-th response conductances are sequentially increased in the calibration mode.

* * * * *